(12) United States Patent
Grande

(10) Patent No.: US 12,483,749 B2
(45) Date of Patent: Nov. 25, 2025

(54) COMBINED MEDIA CAPABILITY FOR MULTIPLE MEDIA DEVICES

(71) Applicant: Roku, Inc., San Jose, CA (US)

(72) Inventor: Marcus Bryan Grande, San Jose, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 18/628,254

(22) Filed: Apr. 5, 2024

(65) Prior Publication Data

US 2024/0251125 A1    Jul. 25, 2024

Related U.S. Application Data

(63) Continuation of application No. 17/492,120, filed on Oct. 1, 2021, now Pat. No. 11,985,377.

(51) Int. Cl.
*H04N 21/4363* (2011.01)
*H04N 21/41* (2011.01)
*H04N 21/45* (2011.01)

(52) U.S. Cl.
CPC ... *H04N 21/43635* (2013.01); *H04N 21/4108* (2013.01); *H04N 21/4524* (2013.01)

(58) Field of Classification Search
CPC ......... H04N 21/43635; H04N 21/4108; H04N 21/4524
See application file for complete search history.

(56) References Cited

U.S. PATENT DOCUMENTS

| 2004/0253965 | A1* | 12/2004 | Sato | G08G 1/0962 |
| | | | | 455/456.3 |
| 2007/0186015 | A1* | 8/2007 | Taft | G09G 5/006 |
| | | | | 710/16 |
| 2007/0222779 | A1* | 9/2007 | Fastert | G06T 1/00 |
| | | | | 345/418 |
| 2010/0088280 | A1* | 4/2010 | Satoyama | G06F 3/0608 |
| | | | | 707/E17.007 |
| 2014/0253413 | A1 | 9/2014 | Nair et al. | |
| 2014/0267905 | A1* | 9/2014 | Lee | H04N 21/44231 |
| | | | | 348/462 |
| 2015/0020167 | A1 | 1/2015 | Yu et al. | |
| 2017/0229093 | A1* | 8/2017 | Sivertsen | G06F 3/14 |
| 2019/0005917 | A1 | 1/2019 | Urata et al. | |
| 2023/0106992 | A1 | 4/2023 | Grande | |

* cited by examiner

*Primary Examiner* — Yassin Alata
(74) *Attorney, Agent, or Firm* — STERNE, KESSLER, GOLDSTEIN & FOX P.L.L.C.

(57) ABSTRACT

Disclosed herein are system, apparatus, article of manufacture, method and/or computer program product embodiments, and/or combinations and sub-combinations thereof, for a media device receiving from a source media device a request about a media capability of the media device, and identifying a data block indicating a default capability of the media device. The media device can further select a data unit of the data block to be replaced based on a media capability of a downstream media device attached to the media device. Afterward, the media device can modify the data block by replacing the selected data unit by information indicating the media capability of the downstream media device to generate a modified data block to represent a combined media capability of the media device and the downstream media device. In addition, the media device can send the modified data block to the source media device.

20 Claims, 8 Drawing Sheets

COMBINED MEDIA CAPABILITY FOR MULTIPLE MEDIA DEVICES

CROSS REFERENCE TO RELATED APPLICATIONS

This application is a continuation of U.S. patent application Ser. No. 17/492,120, filed Oct. 1, 2021, now allowed, which is hereby incorporated by reference in its entirety.

BACKGROUND

Field

This disclosure is generally directed to capabilities of media devices, and more particularly to a media system having multiple media devices with a combined media capability.

Background

Media systems can include multiple media devices coupled together to provide audio, visual, and voice technologies for movies, TV, music, and gaming with immersive sound and pictures. Individual media devices used in such configurations may include a streaming media device, a DVD or Blu-ray device, an audio/video playback device, a cable box, and/or a digital video recording device, to name just a few examples. Multiple media devices can be coupled to generate improved user experiences, with better sound or picture than an individual media device can provide. However, multiple media devices can be of different brands made by different manufacturers with different capabilities such as image resolutions and sound qualities. To match and coordinate the multiple media devices to produce improved multimedia results may be a challenge.

SUMMARY

Provided herein are system, apparatus, article of manufacture, method and/or computer program product embodiments, and/or combinations and sub-combinations thereof, for a media system having multiple media devices with a combined media capability. A display device, which can be an example of a media device, can generate a combined media capability of the display device and a downstream media device attached to the display device. The combined media capability can be an improvement over a default capability of the display device alone. The display device can further report to a source media device the combined media capability. Based on the combined media capability, the source media device can generate a multimedia content including a video content and an audio content to be played by the display device and the downstream media device together to produce improved user experiences.

An example embodiment of a display device can receive, from a source media device, a request about a media capability of the display device, and identify a data block indicating a default capability of the display device in response to receiving the request. The display device can further select a data unit of the data block to be replaced based on a media capability of a downstream media device attached to the display device. Afterward, the display device can modify the data block by replacing the selected data unit by information indicating the media capability of the downstream media device to generate a modified data block to represent a combined media capability of the display device and the downstream media device. In addition, responsive to the request, the display device can send the modified data block to report the combined media capability to the source media device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

A media system having multiple media devices has the potential to produce better user experiences than an individual media device alone. Multiple media devices can be of different brands made by different manufacturers with different default capabilities such as image resolutions and sound qualities. Accordingly, it is important to coordinate the multiple media devices to have a combined media capability to produce better user experiences.

In some embodiments, a source media device can be a Blu-ray player coupled to media device, which can be a TV to provide media content to the TV. The Blu-ray player can read a media capability of the TV to learn of the audio and video capabilities of the TV. By default, a data block stored in the TV can indicate the default capability of the TV, and the audio capabilities of the data block reflects the audio decoding capabilities of the TV alone. When an audio/video receiver (AVR) is coupled to the TV, the AVR can have additional capabilities beyond what the TV can support natively. In order for the TV to communicate to the Blu-ray player of the additional audio capabilities, the TV can modify the data block by adding information to the data block to indicate the combined media capability of both the TV and the AVR. Once it has learned the combined media capability of both the TV and the AVR, the Blu-ray player can provide multimedia content to the TV and the AVR accordingly. For example, the Blu-ray player can provide audio content to be played by the AVR, which can have better quality than the audio content to be played by the TV.

Embodiments herein present a media system including multiple media devices, such as a source media device to provide media content, a display device, and a downstream media device attached to the display device. Together, the display device and the downstream media device can have a combined media capability to produce improved user experiences than the display device alone. The display device can report to the source media device the combined media capability of the display device and the downstream media device so that the source media device can provide a multimedia content based on the combined media capability. The display device can generate an indication of the combined media capability by identifying a data block indicating a default capability of the display device, selecting a data unit of the data block to be replaced based on a media capability of the downstream media device, and modifying the data block by replacing the selected data unit by information indicating the media capability of the downstream media device. The display device is used as an example of any media device.

Figure 1:
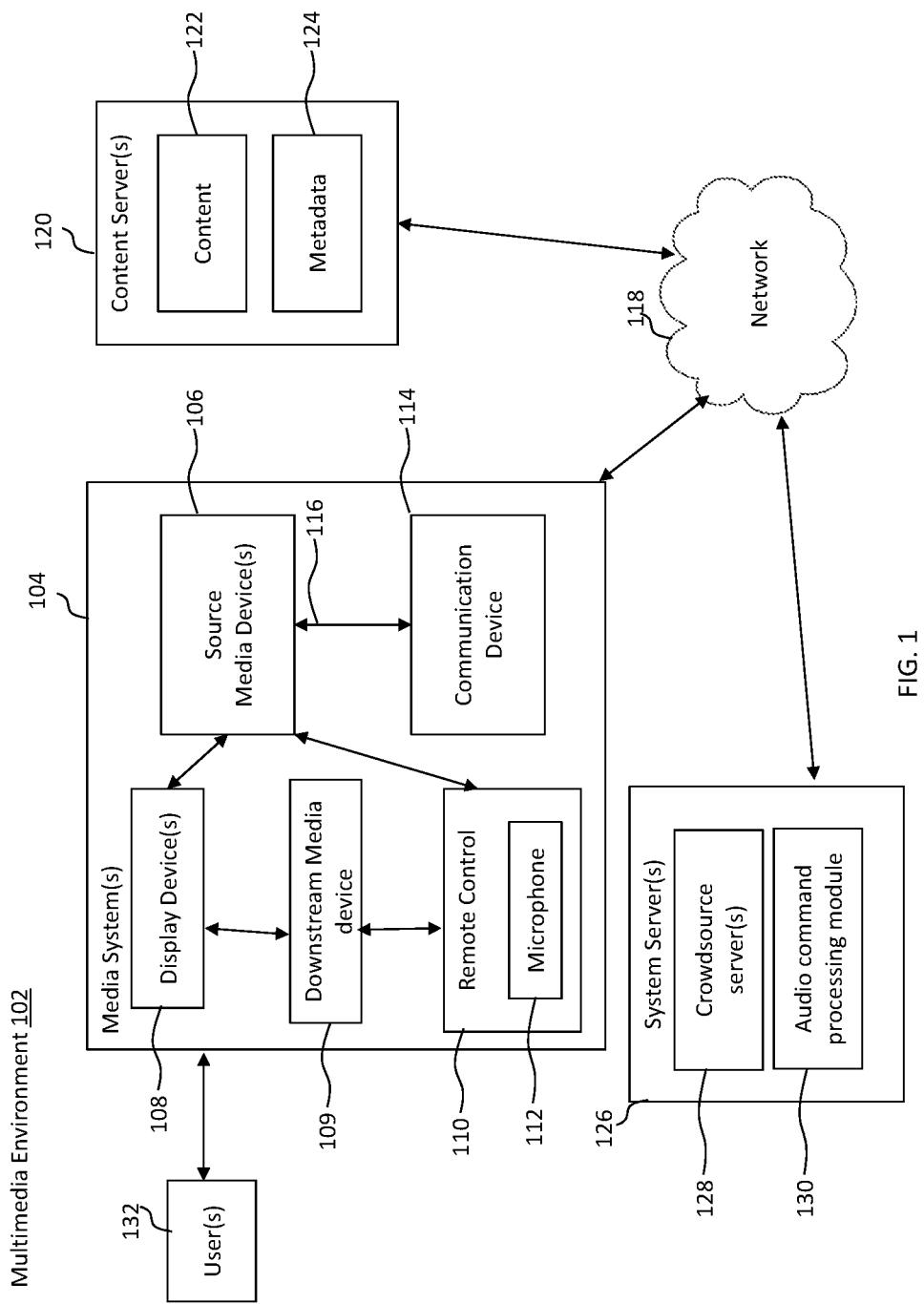
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to multimedia environment 102, as will be appreciated by persons skilled in the relevant art(s) based on the teachings contained herein. An example of multimedia environment 102 shall now be described.

Multimedia Environment

FIG. 1 illustrates a block diagram of multimedia environment 102, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. Media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with media system 104 to select and consume content.

Each media system 104 may include one or more media devices 106 each coupled to one or more display devices 108, which may be further coupled to one or more downstream media devices 109. It is noted that terms such as "coupled," "connected to," "attached," "linked," "combined" and similar terms may refer to physical, electrical, magnetic, logical, etc., connections, unless otherwise specified herein.

Media device 106 may be a streaming media device, a streaming set-top box (STB), cable and satellite STB, a DVD or Blu-ray device, an audio/video playback device, cable box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, attached to, operatively coupled to, and/or connected to its respective display device 108. Downstream media device 109 can be a speaker, audio/video receivers (AVRs), soundbars, or other audio devices attached to display device 108. Media device 106 can provide multimedia content to display device 108 and downstream media device 109. Hence media device 106 can be referred to as a source media device.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as WiFi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106, display device 108, and/or downstream media device 109, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106, display device 108, and/or downstream media device 109 using cellular, Bluetooth, infrared, etc., or any combination thereof.

Multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122, such as but not limited to a trick mode index.

Multimedia environment 102 may include one or more system servers 126. System servers 126 may operate to support media device 106 from the cloud. It is noted that the structural and functional aspects of system servers 126 may wholly or partially exist in the same or different ones of system servers 126.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132 watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streaming of the movie.

System servers 126 may also include an audio command processing module 130. As noted above, remote control 110 may include a microphone 112. Microphone 112 may receive audio data from user 132 (as well as other sources, such as display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize a verbal command from user 132. Audio command processing module 130 may then forward the verbal command back to media device 106 for processing.

Figure 2:
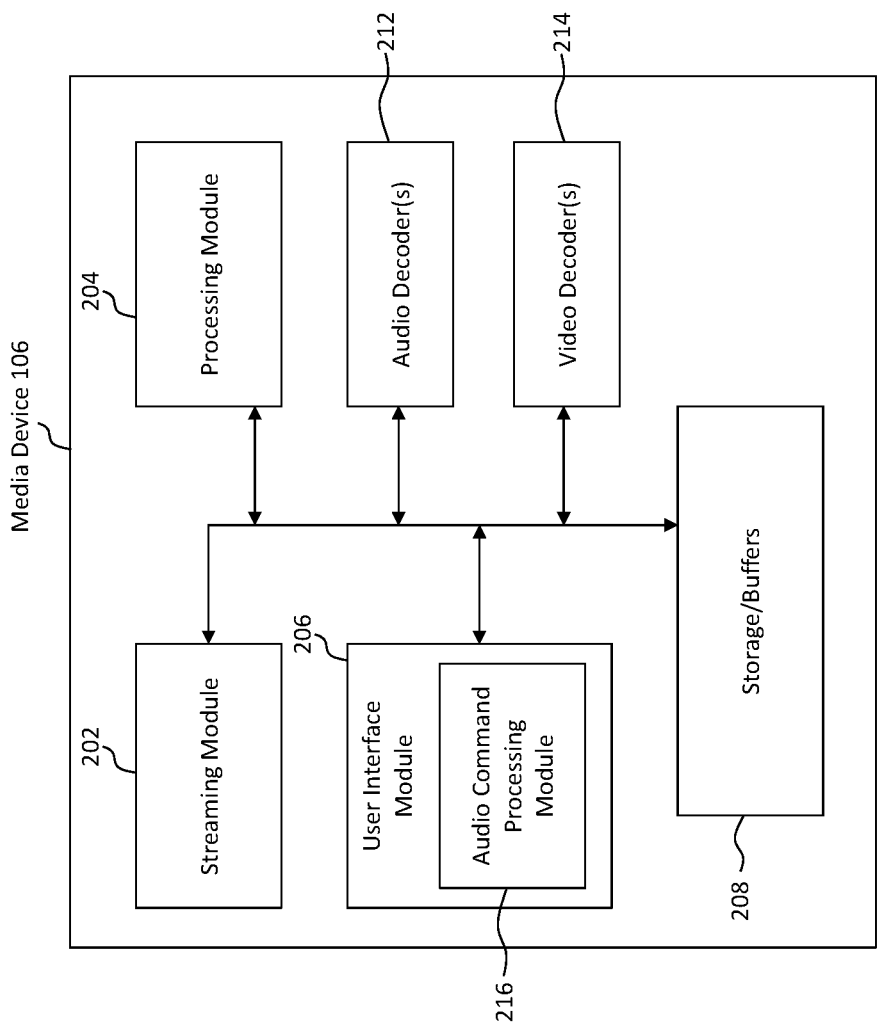
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, a storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 and/or downstream media device 109 for playback to user 132.

In streaming embodiments, streaming module 202 may transmit the content to display device 108 and/or downstream media device 109 in real time or near real time as it receives such content from content server(s) 120. In non-streaming embodiments, media device 106 may store the content received from content server(s) 120 in storage/buffers 208 for later playback on display device 108.

As noted above, this disclosure describes various embodiments for managing the coordination between the media device 106, display device 108, and/or downstream media device 109. Display device 108 can report to media device 106 a combined media capability of display device 108 and downstream media device 109. The combined media capability can be generated by identifying a data block indicating a default capability of display device 108, and replacing a data unit of the data block based on information indicating a media capability of downstream media device 109 to generate the combined media capability.

Figure 3A:
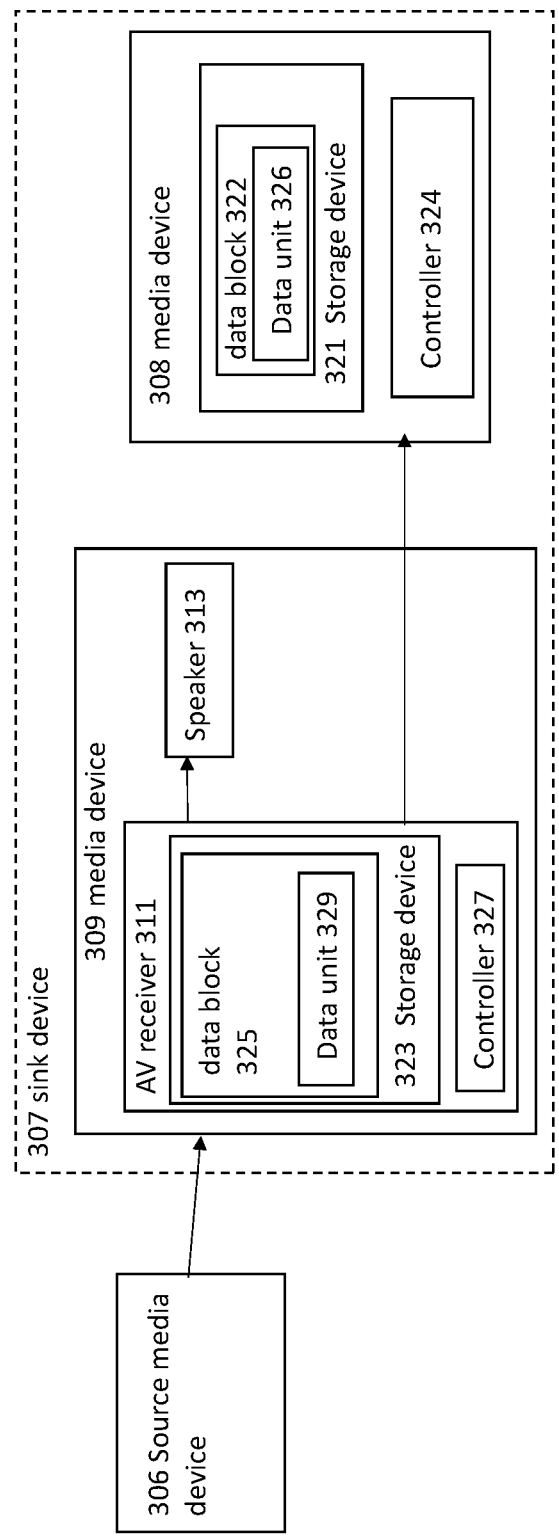
FIGS. 3A-3B illustrate example systems having multiple media devices with a combined media capability, according to some embodiments.
Figure 3B:
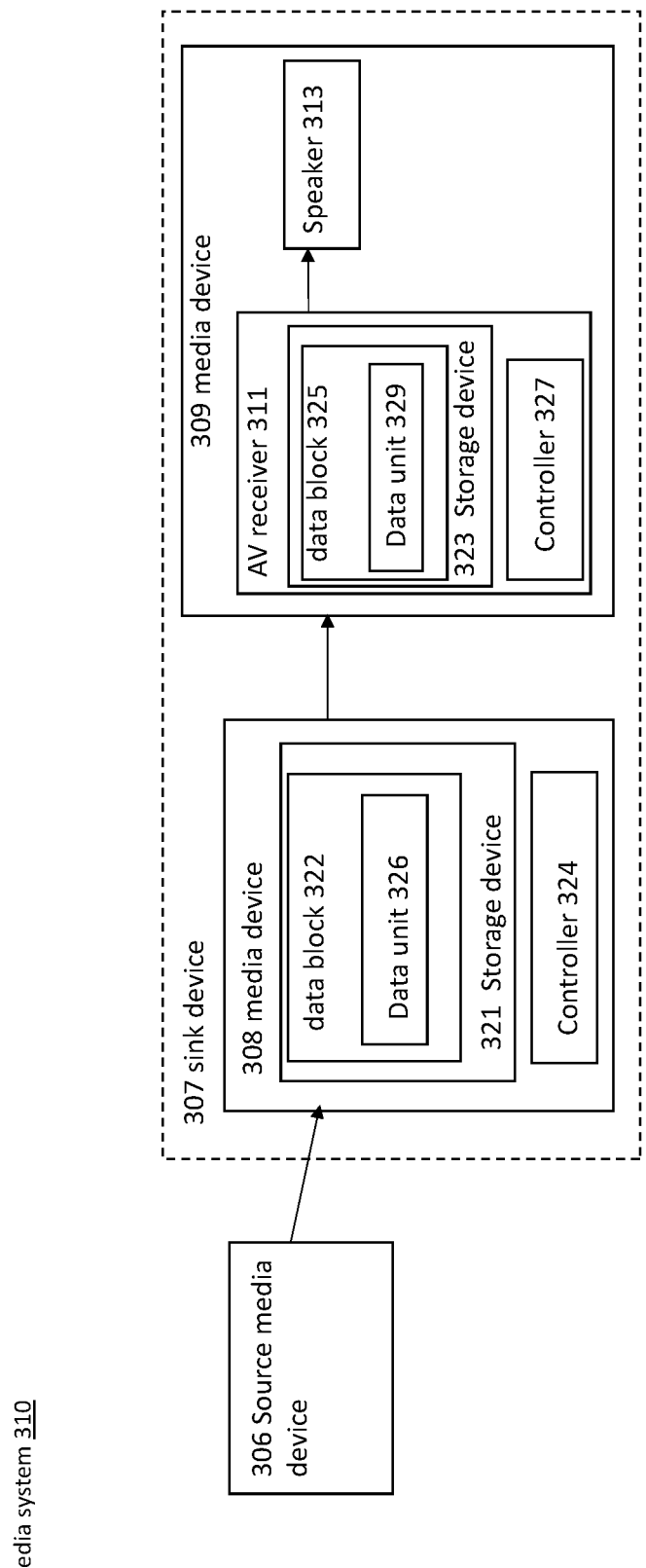

Coordination Between a Source Media Device, a Display Device, and a Downstream Media Device FIGS. 3A-3B illustrate example media systems, a media system 300 or a media system 310, having multiple media devices with a combined media capability, according to some embodiments. Media system 300 includes a source media device 306 coupled to a first media device 308, which is further coupled to a second media device 309 in sequence. Media system 310 includes source media device 306 coupled to the second media device 309, which is further coupled to the first media device 308. Source media device 306, the first media device 308, and the second media device 309 are examples of source media device 106, display device 108, and downstream media device 109, as shown in FIG. 1. The first media device 308 and the second media device 309 combined can be viewed as a sink device 307 with respect to source media device 306. Source media device 306, the first media device 308, and the second media device 309 can be coupled by a high-definition multimedia interface (HDMI) cable, some other wired connections, or wireless connections.

In some embodiments, source media device 306, the first media device 308, and the second media device 309 can perform functions of one or more devices selected from a streaming media device, DVD or Blu-ray device, an audio/video playback device, a cable box, a digital video recording device, a monitor, a television (TV), a computer, a smart phone, a tablet, a wearable (such as a watch or glasses), an appliance, an internet of things (IoT) device, a projector, a speaker, an audio/video receivers (AVRs), a soundbar, or other audio device or video device.

Source media device 306 can provide multimedia content including a video content and an audio content to be played by sink device 307, which includes the first media device 308 and the second media device 309. In some embodiments, sink device 307 can include more devices in addition to the first media device 308 and the second media device 309. Sink device 307 can have various configurations.

As shown in FIG. 3A, in system 300, the second media device 309 is coupled to source media device 306, and the first media device 308 is a downstream media device attached to the second media device 309. The second media device 309 can play the audio content of the multimedia content, and the downstream media device, the first media device 308, can play the video content of the multimedia content. As an example of system 300 shown in FIG. 3A, an AVR and a speaker can serve as an audio sink device to a Blu-ray player or game console that is connected to the AVR. The AVR can consume the audio content and play the audio content while passing through the video content to the downstream video sink device, e.g., a TV.

As shown in FIG. 3B, for system 310, the first media device 308 is coupled to source media device 306, and the second media device 309 is a downstream media device attached to the first media device 308. The first media device 308 can play a video content of a multimedia content, and the downstream media device, the second media device 309, can play an audio content of the multimedia content from source media device 306.

In some embodiments, the first media device 308 can be a TV, and the second media device 309 can include an AVR 311 coupled to a speaker 313. As an example of system 310, source media device 306 can be coupled to the HDMI input ports on the TV, which is the first media device 308. The TV receives multimedia content including a video content and an audio content from source media device 306, displays the video content locally but forwards the audio content to AVR 311. AVR 311 can decode the audio content and plays the audio content on speaker 313, which can be surround speakers. Accordingly, the combination of the TV, which is the first media device 308, AVR 311, and speaker 313 can provide richer user experiences than playing both the video content and the audio content by the first media device 308 alone.

In some embodiments, the first media device 308 can be a smart TV that includes its own streaming applications, where the streaming applications can play the role of source media device 306. Accordingly, the smart TV can act as both a source media device and a part of the sink media device, displaying the video content locally. In addition, the smart TV can forward the audio content to AVR 311 and speaker 313 of the second media device 309. AVR 311 can decode the audio content and play it the audio content by speaker 313. Accordingly, the combination of the smart TV (the first media device 308), AVR 311, and speaker 313 can provide richer user experiences than playing both the video content and the audio content by the first media device 308 alone.

In some embodiments, the first media device 308 can include a storage device 321 to store a data block 322 specifying or representing a media capability. Data block 322 can include one or more data units 326. A data unit can be a basic unit of operation for embodiments herein, which can be a single bit or byte, or a larger unit representing some media properties of media devices. The media capability represented by data block 322 can be a default capability of the first media device 308, or a combined media capability of sink device 307 including both the first media device 308 and the second media device 309. The default capability of the first media device 308 represents a capability of the first media device 308 without using a downstream media device, the second media device 309, attached to the first media device 308. In some examples, the default capability of a media device can be set up at the factory when the media device is manufactured. In some embodiments, the default capability of the first media device 308 represented by data block 322 can include an enhanced audio return channel (eARC) capability. In addition, the first media device 308 can include a controller 324 performs various operations, e.g., operations described in more details for FIGS. 5-6 below, to generate a combined media capability of sink device 307.

In some embodiments, the second media device 309 or AVR 311 can include a storage device 323 to store a data block 325 representing a media capability. Data block 325 can include one or more data units 329. The media capability represented by data block 325 can be a default capability of the second media device 309, or a combined media capability of any media devices attached to the second media device 309. The default capability of the second media device 309 represents a capability of the second media device 309 without using a downstream media device attached to the second media device 309. In some embodiments, the default capability of the second media device 309 can include an eARC capability. In addition, the second media device 309 or AVR 311 can include a controller 327 performs various operations, e.g., operations described in more details for FIGS. 5-6 below.

In some embodiments, speaker 313 can be built-in speakers integrated with AVR 311 to form the second media device 309. Accordingly, the default capability of the second media device 309 represented by data block 325 includes the capability of AVR 311 and the capability of speaker 313. In some other embodiments, to form the second media device 309, speaker 313 is not integrated with AVR 311 at the time of being manufactured, but attached to AVR 311 at a later time. Accordingly, data block 325 may be formed by taking information from both AVR 311 and speaker 313 to indicate the combined capability of AVR 311 and speaker 313. The media capability represented by data block 325 can include a first capability for AVR 311 and a second capability for speaker 313 combined with AVR 311, which may be attached to AVR 311 or integrated with AVR 311. The media capability represented by data block 325 can be either a default capability or a combined capability.

Figure 4:
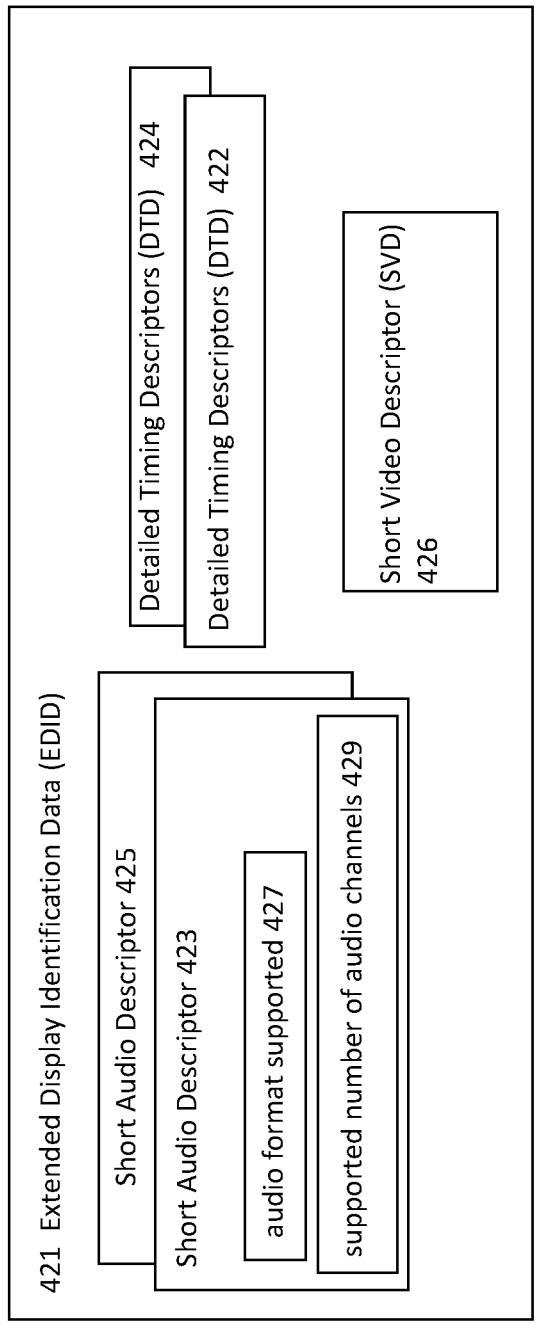
FIG. 4 illustrates an example data block indicating a media capability, according to some embodiments.

FIG. 4 illustrates an example data block 421 indicating a media capability, which can be a default capability of a media device, or a combined capability of multiple media devices. Data block 421 can be an example of data block 322 within the first media device 308, or data block 325 within the second media device 309. Data block 421 can be an extended display identification data (EDID) data block used by a video device, e.g., the first media device 308, or an audio device, e.g., the second media device 309, to communicate audio and video capabilities to source media device 306. The base EDID data block is defined by the HDMI standard to be 128 bytes in size. Additional extension blocks of 128 bytes can be added to the base EDID data block to hold additional data. Data block 421 can be any version of EDID data block, and can be a data block defined by other standards with similar structures. In some embodiments, data block 421 can include detailed timing descriptor (DTD) 422, DTD 424, a short audio descriptor (SAD) 423, a SAD 425, and a short video descriptor (SVD) 426. Other components of data block 421 are not shown.

In some embodiments, DTD 422 can have 18-byte blocks to communicate video capabilities. DTD 422 can hold video mode and timing data, such as 1920×1080 resolution @60 Hz (1080p video). SVD 426 can be of a small size, e.g., 1-byte, which can be an alternative way to specify video capabilities. The value of SVD 426 can represent an entry in a standard lookup table of video capabilities. Data block 421 can contain a combination of DTDs and SVDs.

In some embodiments, DTD 422 and DTD 424 can have an associated priority. In some examples, DTD 422 can have a higher priority than DTD 424. When data block 421 includes multiple DTDs, the DTDs can be listed by the order of priority, from a most preferred DTD to a least preferred DTD. A DTD with less priority can often be assigned to specify legacy video formats for older devices.

In some embodiments, SAD 423 can have 3-bytes describing a specific audio capability. SAD 423 can include a field 427 indicating the audio format supported by the media device, and a field 429 indicating a number of audio channel supported by the media device. The audio format supported by the media device can include Pulse-Code Modulation (PCM) Stereo, Dolby Digital Plus, Digital Theater Systems (DTS) audio format such as DTS-High Resolution (HD) audio. SAD 423 can further include more fields to indicate the supported sample rates, bit rates, etc., where the exact contents can vary based on the particular audio format. For each audio format supported by the media device, a separate SAD is included in data block 421. As such, if a TV supports PCM Stereo, Dolby Digital, and Dolby Digital Plus audio decoding, the TV can contain 3 SADs, one for each of these formats.

In some embodiments, data block 421 can indicate the default capability of the first media device 308, or a combined media capability of sink device 307 including both the first media device 308 and the second media device 309. For example, the first media device 308 can be a TV, data block 322 of the first media device 308 can be its default capability to indicate the audio and video capabilities of the TV, where the audio capabilities of the default capability of the TV can reflect the audio decoding capabilities of the TV. When the second media device 309, e.g., AVR 311, is attached to the first media device 308, AVR 311 can have additional capabilities beyond what the TV can support by itself as indicated by its default capability. For example, if the TV and AVR both support eARC, then AVR might be able to support Dolby Atmos, Dolby TrueHD, and DTS-HD Master Audio over the HDMI cable connected between the TV and AVR. The first media device 308 can modify the default capability indicated by data block 322 to generate a modified data block to include additional audio capability based on the media capability of AVR 311. The TV can modify data block 322 dynamically by adding a SAD corresponding to the media capability of AVR 311 into data block 322. The first media device 308 can further communicate to source media device 306, e.g., a Blu-ray player, the additional audio capabilities indicated by the modified data block. More details of the usage of data block 322 and data block 421 can be shown in FIG. 5 below.

Figure 5:
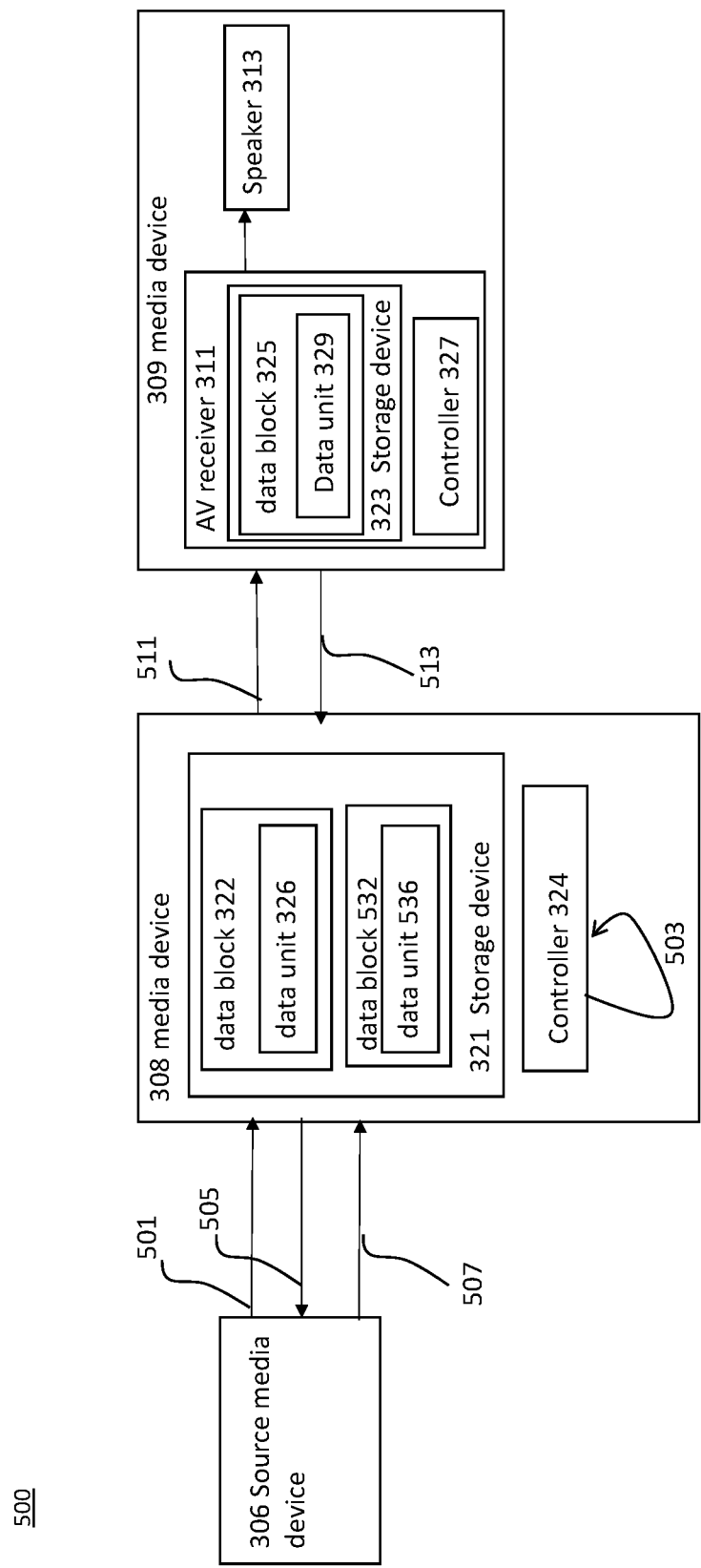
FIG. 5 illustrates an example sequence diagram of operations performed by a media system having multiple media devices with a combined media capability, according to some embodiments.

FIG. 5 illustrates an example sequence diagram 500 of operations performed by media system 310 having multiple media devices with a combined media capability, according to some embodiments. The details of the components of media system 310 have been described above for FIGS. 3A-3B and FIG. 4. Similar operations can be performed by media system 300 shown in FIG. 3A, not shown herein.

In some embodiments, source media device 306 can be a Blu-ray player coupled to the first media device 308, which can be a TV. The Blu-ray player can read the EDID data block of the TV to learn of the audio and video capabilities of the TV. By default, the EDID data block of the TV indicates the default capability of the TV, and the audio capabilities of the EDID data block of the TV reflects the audio decoding capabilities of the TV alone. When AVR 311 is coupled to the TV, AVR 311 can have additional capabilities beyond what the TV can support natively. In order for the TV to communicate to the Blu-ray player of the additional audio capabilities, the TV can modify the EDID data block by adding information to the EDID data block, such as adding SAD 423, to indicate the combined media capability of both the first media device 308, the TV, and the second media device 309. Once learned the combined media capability of both the TV and the AVR 311, the Blu-ray player can provide multimedia content to the TV and the AVR 311 accordingly. For example, the Blu-ray player can provide audio content to be played by AVR 311, which can have better quality than the audio content to be played by the TV.

At 501, the first media device 308 can receive, from source media device 306, a request about a media capability of the first media device 308. The first media device 308 includes data block 322 indicating its media capability, which can be the default capability.

At 503, the first media device 308 can modify data block 322 to generate a modified data block 532 to represent a combined media capability of the first media device 308 and downstream the second media device 309. The first media device 308 can add to data block 322 data unit 536 containing information to indicate the media capability of downstream media device 309. In some embodiments, the default capability of the first media device 308 can include an eARC capability. In addition, the media capability of downstream media device 309 can include ARC, eARC (which has built-in detection capability), HDMI, Consumer Electronics Control (CEC) (which is used for classic ARC and optical connections), or any other audio output channel. In some embodiments, the first media device 308 can also remove some content, e.g., data unit 326, from the original data block 322 so that data unit 536 is a replacement of data unit 326. Hence, data block 322 is modified to become data block 532. More details of operations performed at 503 are described below. In some embodiments, the first media device 308 can send an inquiry to downstream media device 309 according to a multimedia communication protocol, such as ARC, eARC, HDMI, CEC, and the first media device 308 can receive the media capability from downstream media device 309 over a return channel of the multimedia communication protocol.

At 505, the first media device 308 can send, to source media device 306, modified data block 532 responsive to the request to report the combined media capability. Source media device 306 can receive modified data block 532, and generate a multimedia content based on the combined media capability of the first media device 308 and downstream media device 309 as represented by modified data block 532.

At 507, the first media device 308 can receive, from source media device 306, a multimedia content including a video content and an audio content to be played by the first media device 308 and downstream media device 309. The first media device 308 can play the video content and pass the audio content to downstream media device 309 to be played by AVR 311 and speaker 313.

More details are described for operations performed at 503 to generate modified data block 532. Responsive to receiving the request from source device 306, the first media device 308 can identify a data block indicating a default capability of the first media device 308, e.g., data block 322. Afterwards, the first media device 308 can add data unit 536 to data block 322 to indicate the media capability of downstream media device 309.

In some embodiments, the first media device 308 have acquired the media capability of downstream media device 309 and saved the media capability of downstream media device 309 in storage device 321 already. In some other embodiments, at 511, the first media device 308 can send an inquiry about the media capability of downstream media device 309. Afterwards, at 513, the first media device 308 can receive from downstream media device 309, the media capability for media device 309. The media capability of downstream media device 309 can either be a default capability of downstream media device 309 if no other media device is attached to downstream media device 309, or a combined media capability with other media devices attached to downstream media device 309.

In addition, the first media device 308 can modify data block 322 to generate modified data block 532 to represent a combined media capability of the first media device 308 and downstream media device 309. In some embodiments, data unit 536 can be added to data block 322 to become modified data block 532 without removing any other data from data block 322. Data unit 536 can have some identical information from the media capability of downstream media device 309. Alternatively, data unit 536 can have modified information to represent the media capability of downstream media device 309.

However, in some embodiments, data block 322 can have a limited size, and it may not be feasible to simply add a data unit 536 into data block 322. Even though the HDMI specifications allow for any number of extension blocks, the overall size of data block 322 can still be limited by physical memory and storage constraints, bill of material (BoM) constraints, or other technical or financial constraints. In some embodiments, data block 322 can include only one single EDID extension data block. Accordingly, it may be a challenge to add a number of SADs to data block 322 to indicate the media capability of downstream media device 309.

In some embodiments, the content of data unit 326 may be removed to vacant the space to add information indicating the media capability of downstream media device 309. Hence, data unit 536 can be a replacement of data unit 326, which occupies a part of spaces occupied by data unit 326. In some embodiments, data block 322 is an EDID block, data unit 326 includes a DTD, and the first media device 308 can replace a DTD by one or more SADs to indicate the media capability of downstream media device 309.

In one embodiment, to remove a data unit, e.g., a DTD, from data block 322, the content of the data unit or the DTD can be first saved into memory or storage device 321 of the first media device 308. Afterwards, information about the media capability of downstream media device 309 can be saved into the storage space occupied by the data unit or the DTD that has been saved into the storage device 321 to generate modified data block 532 to represent a combined media capability of the first media device 308 and downstream media device 309. Later if media device 309 or AVR 311 is removed from being attached to the first media device 308, the original data block 322 can be restored using the saved copy.

In some embodiments, there can be various criteria used to select data unit 326 of data block 322 to be replaced by data unit 536. The first media device 308 can select data unit 326 to be removed based on a geographic location of the first media device 308 or a user profile associated with the first media device 308. In some other embodiments, data block 322 can include a first DTD with a first priority and a second DTD with a second priority lower than the first priority, and the selected data unit 326 to be replaced can be the second DTD with the second priority. When there are multiple DTDs saved in data block 322, the selected data unit 326 can have the least priority among the multiple DTDs.

However, in some embodiments, the DTD with the lower priority can still be useful to a particular user or the first media device 308. In some other embodiments, the first media device 308 can maintain a list of DTDs for a number of media devices that have been attached to the first media device 308, and the first media device 308 can check the list of DTDs to verify the selected DTD to be removed is not included in the list. For example, the first media device 308 can be a TV, and the TV can keep track of the list of DTD video modes used by the HDMI source device. The list of DTDs may be for a number of media devices prior to coupling AVR 311 to the TV. Alternatively, any time the AVR 311 is turned off and the original EDID is restored, the TV can keep track of what DTDs are used by the various devices plugged into the TV. Even when AVR 311 is used, there is often a time gap before AVR 311 is fully configured, during which the TV can survey what DTDs are in use. If the TV recognizes that any DTD in the list is used across any of the HDMI ports of the TV, that DTD may not be removed even if the DTD has the least priority. In such a case, the next-to-last DTD can become the candidate for removal. The first media device 308 can traverse in reverse order of the priority to identify a DTD to be removed.

In some embodiments, to remove a data unit, e.g., a DTD, from data block 322, the first media device 308 can access a list of a plurality of DTDs for a plurality of media devices that have been attached to source media device 306 to verify the selected DTD with the least priority is not included in the list. For example, the TV can access a database of known HDMI source devices such as game consoles, Blu-ray players, Cable and Satellite STBs, streaming players, etc, and the video formats they support. This database can be included in the TV firmware, read from a USB stick, or if the TV has network connectivity, it can pull the list dynamically from the cloud. The TV can then use HDMI device identifiers such a Source Product Description (SPD) Info frames, CEC On-screen Display (OSD) Names, etc, to identify what devices are attached to the TV. It can then use that information to figure out which DTDs are supported by the various connected devices and eliminate them as candidates for removal.

In some embodiments, the first media device 308 can search a network of media devices including a networked media device, determine a list of a plurality of DTDs for a plurality of media devices that have been attached to the networked media device, and verifying the selected DTD with the least priority is not included in the list of the plurality of DTDs for the plurality of media devices that have been attached to the networked media device. For example, the first media device 308 can be a TV with network connectivity such as home network. The TV can search across the home network for other TVs. Using a pre-established communication protocol, it can communicate with the other TVs and exchange the list of devices connected to the various TVs throughout the home. Each TV then has a full list of the user's home devices and eliminates any DTDs supported by devices in the master list as candidates for ejection. This embodiment accounts for the user moving devices from one TV to another and losing video capabilities it previously had because the DTD it was previously using was already ejected on the other TV. Game consoles are often moved between TVs depending on activity in the home at any given time. This embodiment accommodates that scenario.

Figure 6:
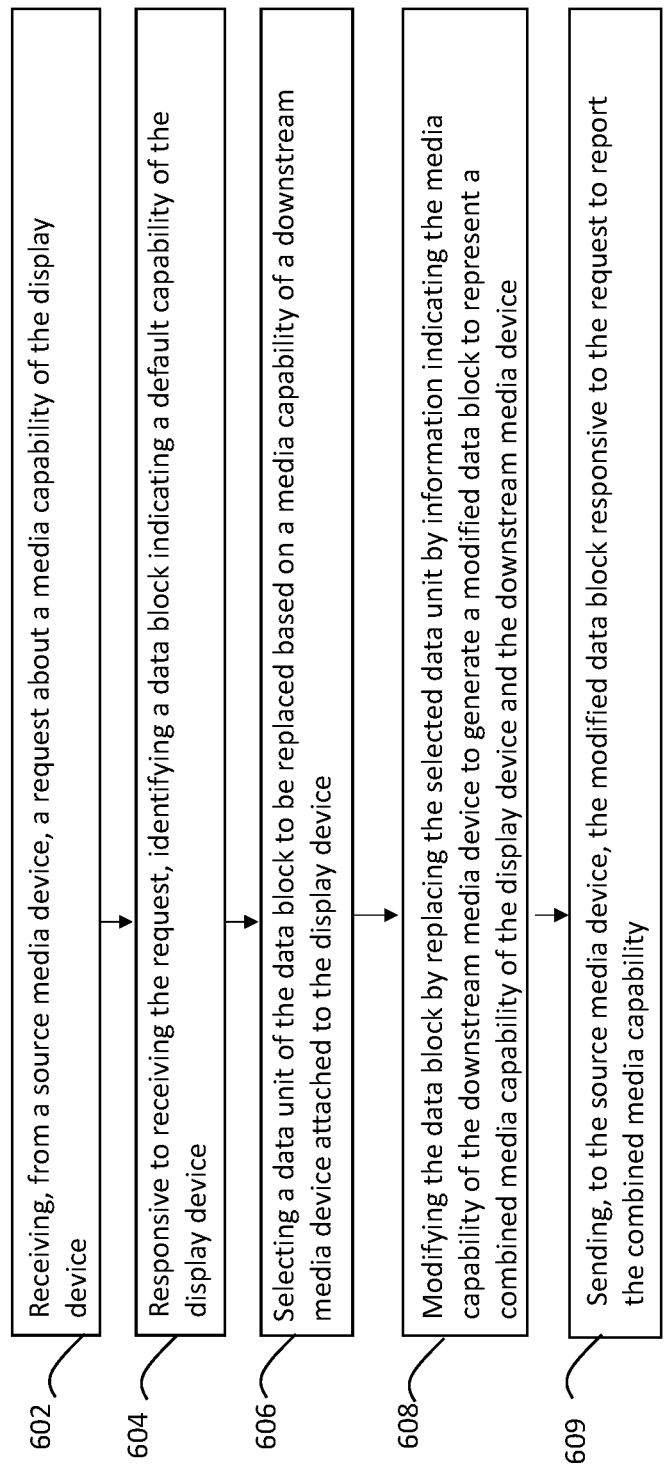
FIG. 6 illustrates an example process performed by a media device of a media system having multiple media devices with a combined media capability, according to some embodiments.

FIG. 6 illustrates an example process 600 performed by a media device of a media system having multiple media devices with a combined media capability, according to some embodiments. Processes 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

At 602, the first media device 308 can receive, from a source media device, a request about a media capability of the display device. For example, as described for FIG. 5, the first media device 308 can receive from source media device 306 a request about a media capability of the display device, as performed at 501.

At 604, in response to receiving the request, the first media device 308 can identify a data block indicating a default capability of the display device. For example, as described for FIG. 5, the first media device 308 can identify data block 322 indicating a default capability of the first media device 308, as part of the operations performed at 503.

At 606, the first media device 308 can select a data unit of the data block indicating the default capability of the first media device 308 to be replaced based on a media capability of a downstream media device attached to the display device. For example, as described for FIG. 5, the first media device 308 can select a data unit of data block 322 to be replaced based on a media capability of downstream media device 309, as part of the operations performed at 503.

At 608, the first media device 308 can modify the data block by replacing the selected data unit by information indicating the media capability of the downstream media device to generate a modified data block to represent a combined media capability of the display device and the downstream media device. For example, the first media device 308 can modify data block 322 by replacing the selected data unit 326 by data unit 536 indicating the media capability of downstream media device 309 to generate modified data block 532 to represent a combined media capability, as part of the operations performed at 503.

At 609, the first media device 308 can send, to the source media device, the modified data block responsive to the request to report the combined media capability. For example, the first media device 308 can send, to source media device 306, modified data block 532 responsive to the request to report the combined media capability, as part of the operations performed at 505.

There can be other operations performed by the first media device 308, which are not shown in process 600. For example, the first media device 308 can send, to downstream media device 309, an inquiry about the media capability of downstream media device 309, and receive, from downstream media device 309, the media capability of downstream media device 309. The first media device 308 can further receive from source media device 306, a multimedia content including a video content and an audio content to be played by the first media device 308 and downstream media device 309. The multimedia content is generated based on the combined media capability of the first media device 308 and downstream media device 309 as represented by modified data block 532.

Example Computer System

Figure 7:
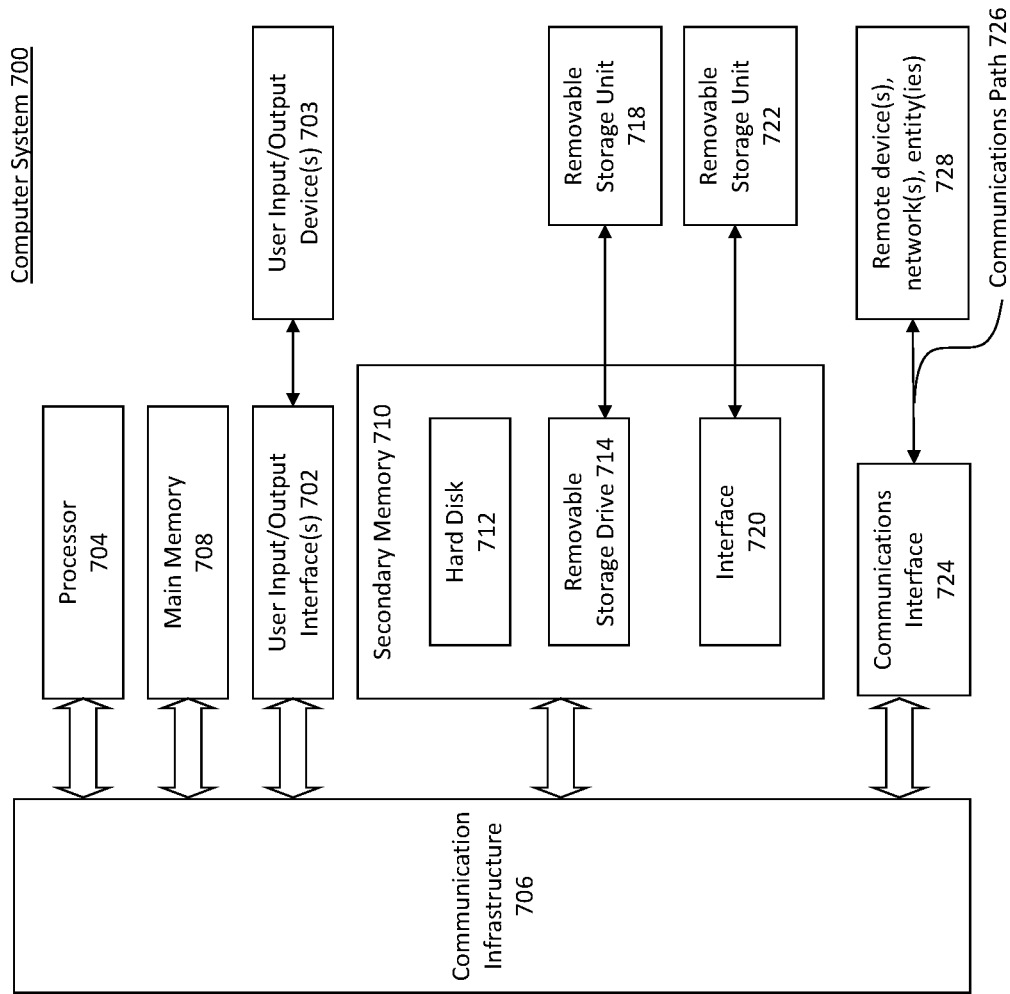
FIG. 7 illustrates an example computer system useful for implementing various embodiments.

Various embodiments may be implemented, for example, using one or more well-known computer systems, such as computer system 700 shown in FIG. 7. For example, media device 106, media device 108, media device 109, media device 306, the first media device 308, or the second media device 309 may be implemented using combinations or sub-combinations of computer system 700 to perform various functions described herein, e.g., by the sequence diagram 500 or process 600. Also or alternatively, one or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for operating a media device, comprising:
receiving, by at least one computer processor and from a source media device, a request to report a media capability of the media device;
responsive to receiving the request, identifying a media capability of a downstream media device attached to the media device;
modifying a data block that indicates a set of default media capabilities of the media device by:
selectively removing a first data unit from the data block based on a priority associated with the first data unit, the first data unit indicating a default media capability in the set of default media capabilities of the media device, wherein the priority is indicative of a preference of a detailed timing descriptor (DTD); and
adding a second data unit to the data block, the second data unit indicating the media capability of the downstream media device; and
sending, to the source media device, the modified data block responsive to the request to report the media capability of the media device.

2. The method of claim 1, wherein modifying the data block that indicates the set of default media capabilities of the media device comprises:
modifying an extended display (EDID) block.

3. The method of claim 2, wherein selectively removing the first data unit from the data block comprises:
selectively removing the DTD from the EDID block.

4. The method of claim 3, wherein selectively removing the DTD from the EDID block comprises:
selecting a particular DTD from among a plurality of DTDs in the EDID block based at least on the priority associated with the particular DTD; and
removing the particular DTD from the EDID block.

5. The method of claim 2, wherein adding the second data unit to the data block comprises:
adding a short audio descriptor (SAD) to the EDID block.

6. The method of claim 1, further comprising:
saving content of the first data unit to a memory of the media device prior to selectively removing the first data unit from the data block; and
restoring the first data unit from the memory to the data block subsequent to the downstream media device being detached from the media device.

7. The method of claim 1, wherein the media device comprises an audio/video receiver coupled to a speaker and the downstream media device comprises a television.

8. The method of claim 1, wherein the media device comprises a television and the downstream media device comprises an audio/video receiver coupled to a speaker.

9. A media device, comprising:
one or more memories; and
at least one processor each coupled to at least one of the memories and configured to perform operations comprising:
receiving, from a source media device, a request to report a media capability of the media device;
responsive to receiving the request, identifying a media capability of a downstream media device attached to the media device;
modifying a data block that indicates a set of default media capabilities of the media device by:
selectively removing a first data unit from the data block based on a priority associated with the first data unit, the first data unit indicating a default media capability in the set of default media capabilities of the media device, wherein the priority is indicative of a preference of a detailed timing descriptor (DTD); and
adding a second data unit to the data block, the second data unit indicating the media capability of the downstream media device; and
sending, to the source media device, the modified data block responsive to the request to report the media capability of the media device.

10. The media device of claim 9, wherein modifying the data block that indicates the set of default media capabilities of the media device comprises:
modifying an extended display (EDID) block.

11. The media device of claim 10, wherein selectively removing the first data unit from the data block comprises:
selectively removing the DTD from the EDID block.

12. The media device of claim 11, wherein selectively removing the DTD from the EDID block comprises:
selecting a particular DTD from among a plurality of DTDs in the EDID block based at least on the priority associated with the particular DTD; and
removing the particular DTD from the EDID block.

13. The media device of claim 10, wherein adding the second data unit to the data block comprises:
adding a short audio descriptor (SAD) to the EDID block.

14. The media device of claim 9, wherein the operations further comprise:
saving content of the first data unit to at least one of the memories of the media device prior to selectively removing the first data unit from the data block; and
restoring the first data unit from the at least one of the memories to the data block subsequent to the downstream media device being detached from the media device.

15. A non-transitory computer-readable medium having instructions stored thereon that, when executed by at least one computer processor of a media device, causes the at least one computer processor to perform operations, the operations comprising:
receiving, from a source media device, a request to report a media capability of the media device;
responsive to receiving the request, identifying a media capability of a downstream media device attached to the media device;
modifying a data block that indicates a set of default media capabilities of the media device by:
selectively removing a first data unit from the data block based on a priority associated with the first data unit, the first data unit indicating a default media capability in the set of default media capabilities of the media device, wherein the priority is indicative of a preference of a detailed timing descriptor (DTD); and
adding a second data unit to the data block, the second data unit indicating the media capability of the downstream media device; and
sending, to the source media device, the modified data block responsive to the request to report the media capability of the media device.

16. The non-transitory computer-readable medium of claim 15, wherein modifying the data block that indicates the set of default media capabilities of the media device comprises:
modifying an extended display (EDID) block.

17. The non-transitory computer-readable medium of claim 16, wherein selectively removing the first data unit from the data block comprises:
selectively removing the DTD from the EDID block.

18. The non-transitory computer-readable medium of claim 17, wherein selectively removing the DTD from the EDID block comprises:
selecting a particular DTD from among a plurality of DTDs in the EDID block based at least on the priority associated with the particular DTD; and
removing the particular DTD from the EDID block.

19. The non-transitory computer-readable medium of claim 16, wherein adding the second data unit to the data block comprises:
adding a short audio descriptor (SAD) to the EDID block.

20. The non-transitory computer-readable medium of claim 15, wherein the operations further comprise:
saving content of the first data unit to a memory of the media device prior to selectively removing the first data unit from the data block; and
restoring the first data unit from the memory to the data block subsequent to the downstream media device being detached from the media device.

* * * * *

UNITED STATES PATENT AND TRADEMARK OFFICE
CERTIFICATE OF CORRECTION

PATENT NO. : 12,483,749 B2  
APPLICATION NO. : 18/628254  
DATED : November 25, 2025  
INVENTOR(S) : Grande Page 1 of 1

It is certified that error appears in the above-identified patent and that said Letters Patent is hereby corrected as shown below:

In the Claims

In Column 17, Claim 2, Line 14, delete "display" and insert -- display identification data --, therefor.

In Column 18, Claim 10, Line 4, delete "display" and insert -- display identification data --, therefor.

In Column 18, Claim 16, Line 56, delete "display" and insert -- display identification data --, therefor.

Signed and Sealed this  
Thirteenth Day of January, 2026

John A. Squires  
*Director of the United States Patent and Trademark Office*